(No Model.)
A. HUGHES.
GLASS CUTTING TABLE.
No. 382,234. Patented May 1, 1888.
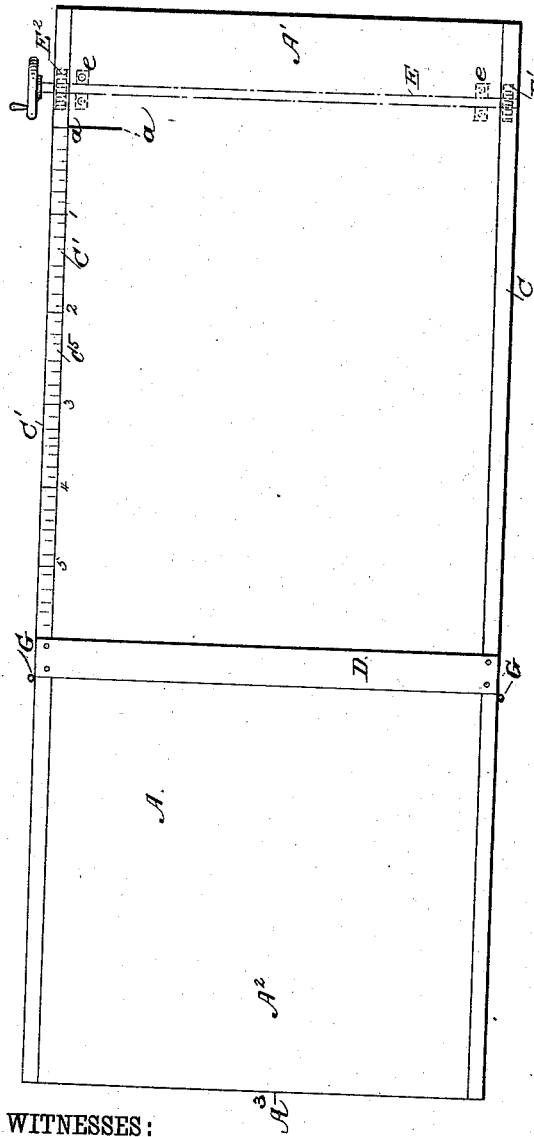
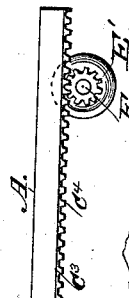
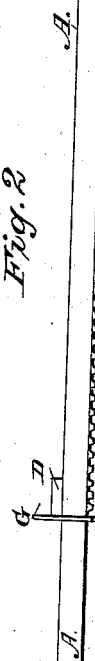
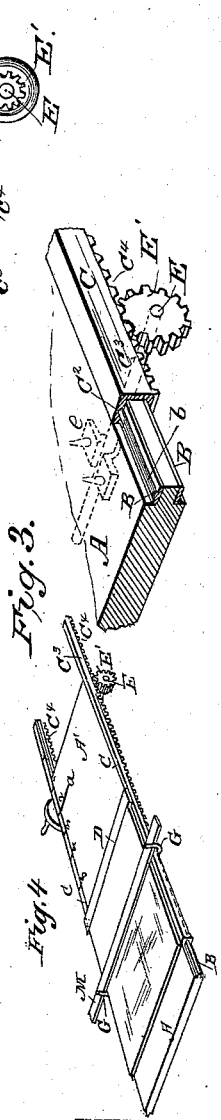
WITNESSES:
INVENTOR:
Alonzo Hughes.
BY
ATTORNEYS.

a feed-slide for moving the glass forward upon the said table to the line of cut, substantially as described.

3. In a glass-cutter's table, the combination, with the table A, of the graduated side strips, C, the cross-strip D, and a feed mechanism for sliding the side strips and cross-strips upon the table, substantially as described.

4. In a glass-cutter's table, the combination, with the table A, of the side strips, C, having toothed racks upon their under sides, a cross-strip, D, and a cross-shaft, E, having gear-pinions F, to engage with the said toothed racks, and a handle for revolving the same, substantially as described.

5. In a glass-cutter's table, the combination, with the board, of guide-plates B, having a rib, $b$, side plates, C, grooved to receive said rib $b$, and provided with a gage-plate upon one side and a toothed rack upon the other side, and a shaft carrying toothed wheels to engage said toothed rack, substantially as described.

6. In a glass-cutter's table, the combination, with the board A, of the side plates, C, having a toothed rack and graduated face, a cross-piece, D, and stops G, against which the straight-edge may be placed when the cut is made, substantially as described.

ALONZO HUGHES.

Witnesses:
INGRAM FLETCHER,
DWIGHT D. PORTER.

UNITED STATES PATENT OFFICE.

ALONZO HUGHES, OF ORLANDO, FLORIDA.

GLASS-CUTTING TABLE.

SPECIFICATION forming part of Letters Patent No. 382,234, dated May 1, 1888.

Application filed May 21, 1887. Serial No. 239,151. (No model.)

*To all whom it may concern:*

Be it known that I, ALONZO HUGHES, of Orlando, in the county of Orange and State of Florida, have invented a new and useful Improvement in Glass-Cutting Tables, of which the following is a specification.

My invention relates to a table especially designed to support a plate of glass and provide a gage to indicate the line where the glass is to be cut.

The improvement consists in certain devices and combinations of parts hereinafter particularly described, and pointed out in the claims.

In the accompanying drawings, Figure 1 is a plan view. Fig. 2 is a side elevation, and Fig. 3 is a detail perspective of a part of my improved device. Fig. 4 represents the machine, a pane of glass thereon, and a straight-edge resting against the stops G, to guide the diamond or other cutter across the glass.

The table A is a square or rectangular board, one end, A', of which is provided with a gage and feed device for sizing and marking the glass with the diamond-point, and the other end, $A^2$, of which is made perfectly plain, and is used simply to support cut pieces of glass, and to provide a smooth edge, $A^3$, at one end of the table, upon which large pieces or sheets of glass may be broken after they have been cut. The edges of the end A' upon both sides of the board are cut down to receive guide-plates of metal, B, upon the upper and lower edges thereof, one at least of said side guide-plates upon each side being provided with a rib, $b$, to form a track for sliding plates C.

The sliding plates C are each formed of a three-sided piece of metal, the upper face of the side C' being marked or graduated to a scale of feet and inches, and having upon its inner face a groove or channel, $c^2$, to receive the rib $b$, and the side $C^3$ of said sliding plates having a toothed rack, $C^4$, upon its under face.

One end of each of the sliding plates C is connected to a cross-strip, D, which rests upon the surface of the table and slides thereon, the plates C being preferably made flush with the surface of the table, and the plate of glass to be cut is laid upon the table to rest against the strip D.

Each of the sliding plates C is formed upon its under side with a rack-bar, $C^4$, cast upon or secured thereto, and a shaft, E, supported by strap-bearings $e$ upon the under side of the table, carries toothed pinions E' $E^2$, to engage with the rack-bars $C^4$, and with a hand wheel or crank secured to the end of said shaft, to move the sliding plates C and cross-strip D forward by turning said crank-handle.

The upper face of one of the slides C is graduated to a scale, $C^5$, of feet and inches, and a gage-mark, $a$, upon the surface of the table will indicate the number of inches moved by the sliding frame.

G G are stops projecting from opposite sides of the table and extending upward in line with the rear edge of the strip D, to form guide-stops, against which a straight-edge, M, may be placed.

The operation is as follows: Suppose the operator desires to cut off two inches from a plate of glass. His first step would be to turn the crank and cause the graduated slide to move forward until the numeral 2 was opposite the mark $o$. The cross strip D would of course be moved a corresponding distance in front of the stops G. A plate of glass is now placed on the end $A^2$ of the table and moved forward until its front edge strikes the edge of the cross-piece D, which cross-piece lies very close to the surface of the table, so that the glass cannot pass under it. A straight-edge is now extended across the glass against the stops G G, (the distance from the straight-edge to the adjacent edge of the cross-piece D being two inches,) and any suitable glass-cutter may be used to cut the glass along the line of the straight-edge.

I am aware that various cutting-tables heretofore used have been provided with graduated edges, and straight edges have been made to slide and have been adjusted and clamped thereon, and do not broadly claim a table of this description.

I claim as my invention and desire to secure by Letters Patent—

1. A glass-cutter's table having an end, A', provided with feeding and gaging devices, and the other end, $A^2$, having a plain surface and straight-edged end upon which the glass may be broken, substantially as described.

2. In a glass-cutter's table, the combination, with the table, of a graduated side strip, and